United States Patent
Xu et al.

(10) Patent No.: US 9,460,747 B2
(45) Date of Patent: Oct. 4, 2016

(54) HYBRID-GUIDED BLOCK COPOLYMER ASSEMBLY

(71) Applicant: Seagate Technology LLC, Cupertino, CA (US)

(72) Inventors: Yuan Xu, Fremont, CA (US); Kim Y. Lee, Fremont, CA (US); David S. Kuo, Palo Alto, CA (US); Koichi Wago, Sunnyvale, CA (US); Wei Hu, Newark, CA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/830,534

(22) Filed: Aug. 19, 2015

(65) Prior Publication Data

US 2015/0356989 A1   Dec. 10, 2015

Related U.S. Application Data

(62) Division of application No. 13/018,416, filed on Jan. 31, 2011, now abandoned.

(51) Int. Cl.
| | |
|---|---|
| *G11B 5/84* | (2006.01) |
| *G11B 5/74* | (2006.01) |
| *G11B 5/855* | (2006.01) |

(52) U.S. Cl.
CPC .............. *G11B 5/84* (2013.01); *G11B 5/746* (2013.01); *G11B 5/855* (2013.01); *Y10T 428/24479* (2015.01); *Y10T 428/24802* (2015.01)

(58) Field of Classification Search
CPC .............. Y10T 428/24802; Y10T 428/24851; G03F 7/0002
See application file for complete search history.

(56) References Cited

U.S. PATENT DOCUMENTS

| | | | | |
|---|---|---|---|---|
| 2007/0281220 | A1* | 12/2007 | Sandhu | H01L 21/0332 430/5 |
| 2009/0196488 | A1* | 8/2009 | Nealey | B81C 1/00031 382/145 |
| 2012/0135159 | A1* | 5/2012 | Xiao | B81C 1/00031 427/534 |
| 2012/0196089 | A1* | 8/2012 | Yang | B81C 1/00031 428/156 |

FOREIGN PATENT DOCUMENTS

| | | |
|---|---|---|
| JP | 2007301839 A | 11/2007 |
| JP | 2010123239 A | 6/2010 |

* cited by examiner

*Primary Examiner* — Gerard Higgins

(57) ABSTRACT

A method for nano-patterning includes imprinting features in a resist with an imprint mold to form one or more topographic surface patterns on the imprinted resist. A block copolymer ("BCP") material is deposited on the imprinted resist, wherein a molecular dimension $L_0$ of the BCP material correlates by an integer multiple to a spacing dimension of the one or more topographic surface patterns on the imprinted resist. The deposited BCP is annealed and at least a portion of the annealed BCP is removed, forming a template having discrete domains.

13 Claims, 6 Drawing Sheets

HYBRID-GUIDED BLOCK COPOLYMER ASSEMBLY

CROSS-REFERENCE TO RELATED APPLICATIONS

This application is a divisional of U.S. patent application Ser. No. 13/018,416, filed Jan. 31, 2011, which is incorporated herein by reference in its entirety.

FIELD

This disclosure relates generally to the use of block copolymers for high density patterning.

BACKGROUND

Bit pattern media (BPM) has been extensively explored by the magnetic recording industry as one of several key solutions to expand perpendicular magnetic recording (PMR) technology in high density disk drives (HDDs). A typical BPM media consists of two repeating zones—a data zone and a servo zone. Data zones consist of homogenous dots to store data bits. Servo zones consist of dots with various patterns to describe a location and address of information in the data zone. In the servo zone, dots need be arranged into various pattern and spacings to encode information such as head position, timing, and tracking following information for a respective data zone.

The storage capacity of BPM is dependent upon the density of the magnetic islands, or "bits" on the media substrate surface. Current processes for achieving high density patterned media include imprint mold fabrication, nano-imprinting and pattern transfer into magnetic dots, and the like.

Self-assembling block copolymer (BCP) enables high-density lithographic bit patterning capability and is a promising material for BPM template fabrication. Directed self-assembly combines 'top-down' lithography (pre-registered pattern) and 'bottom-up' self-assembling materials like block copolymers. Directed self-assembly may generate ultra-high density homogenous patterns.

SUMMARY

In an embodiment, a method for nano-patterning includes imprinting features in a resist on a substrate with an imprint mold to form one or more topographic surface patterns on the resulting imprinted resist. A block copolymer ("BCP") material is deposited on the resulting imprinted resist, wherein a molecular dimension $L_0$ of the BCP material correlates by an integer multiple to a spacing dimension of the one or more topographic surface patterns on the resulting imprinted resist. The deposited BCP is annealed and at least a portion of the annealed BCP is removed, forming a template having discrete domains.

BRIEF DESCRIPTION OF THE FIGURES

Embodiments of this disclosure are illustrated by way of example and not limitation in the figures of the accompanying drawings, in which like references indicate similar elements, and in which.

DETAILED DESCRIPTION

Figure 1A:
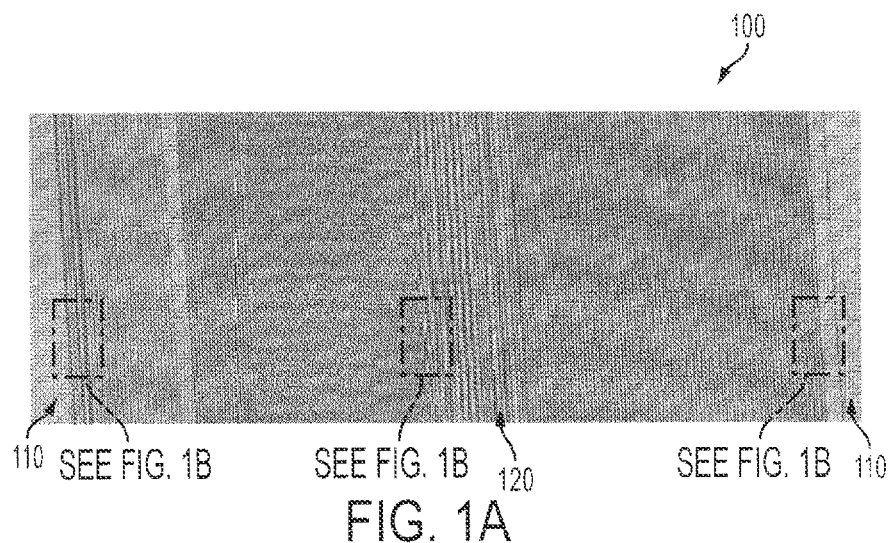
FIG. 1A is an SEM image showing data zones and servo zones in bit patterned media in accordance with an embodiment.
Figure 1B:
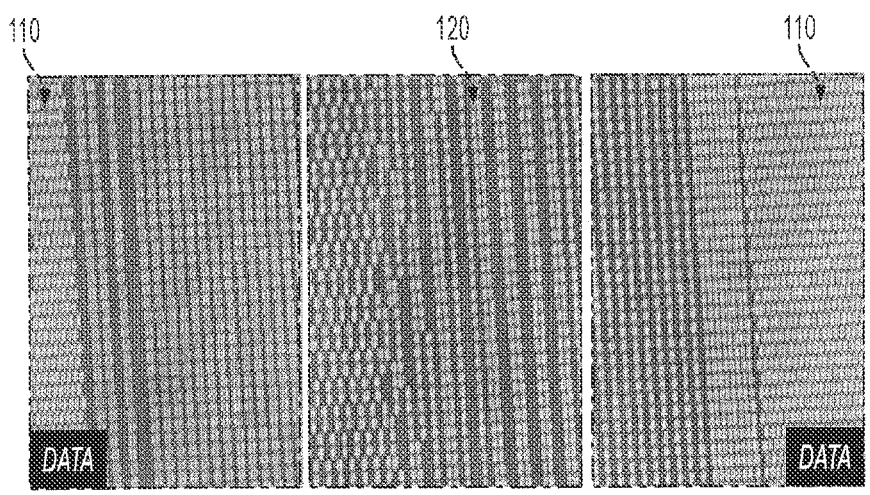
FIG. 1B is an SEM image showing high resolution segments of the bit patterned media of FIG. 1A.

A high density disk drive (HDD) 100 is a medium that has different regions besides the regions used for storing data (data zones 110). For example, as shown in FIGS. 1A and 1B, a bit pattern media HDD 100 includes the data zone 110 which consists of homogeneous dots to store data bits. In addition to a data zone 110, the HDD 110 may typically have a servo zone 120 used to describe the location and address information in the data zone 110. Various shapes and spacings may be formed in the servo zone 120 to encode information such as head position, timing, and track-following information for a respective data zone.

Figure 2:
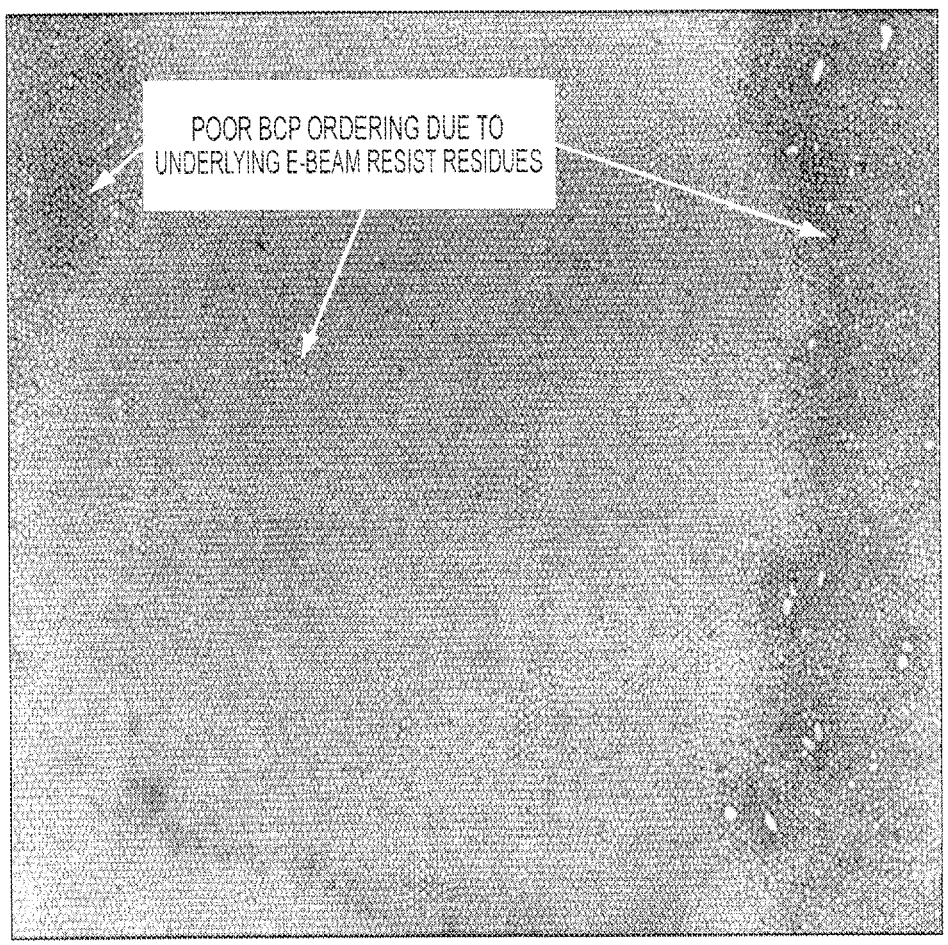
FIG. 2 is a scanning electron microscope ("SEM") image of patterned media pre-patterned using e-beam lithography followed by a BCP patterning process.

FIG. 2 is a scanning electron microscope ("SEM") image of bit patterned media (BPM) pre-patterned using e-beam lithography followed by a BCP patterning process. As FIG. 2 illustrates, the long-range lateral ordering of the bits are compromised by contaminants left behind by the e-beam lithography. Moreover, the chemicals used in the e-beam lithography wet stripping process are typically hazardous to human health and are environmentally unsound.

Referring back to FIGS. 1A and 1B, disclosed herein is a method to fabricate a template for BPM with the servo zone 120 fabrication integrated with the data zone 110 fabrication of BPM by simultaneously forming both data format and servo format zones 110 and 120, respectively, via a hybrid-guided BCP self-assembly process. The method of applying hybrid guiding pre-patterning for BCP self-assembly disclosed here may provide both BCP long-range order for formation of the data zone 110 by utilizing pre-register dots to guide formation of data zone dots and simultaneous shape manipulation for formation of the servo zone 120 by utilizing ridge-groove guiding to form patterns of servo zone dots.

In this method, block copolymer self-assembly in the data zone 110 is guided with pre-patterned dots created with a template. The pre-patterned dots may create chemical/topographical contrast to anchor self-assembly location of polymer blocks and achieve the long range ordering for block copolymer assembly in the data zone.

In an embodiment, a method of self-assembling density multiplied block copolymers (BCP) structures in the data zone 110 includes coating a substrate with an imprint resist. A composition of the BCP is chosen to have a selected molecular dimension $L_0$, wherein the BCP composition includes a first polymer block (A) and a second polymer block (B). The resist is imprinted with an imprint template having imprint features in the data zone 110 spaced at a pitch distance $L_s$ based on the selected composition of the BCP and satisfying the equation $L_s = n \times L_0$, where n is an integer density multiplication factor=0, 1, 2, 3, etc. The imprint resist is cured, and additional process may be performed to prepare the substrate and imprint resist for coating with the BCP. The BCP is annealed to laterally segregate the BCP into self-assembled structures of the first polymer block A surrounded by the second polymer block B, the structures having a lateral spatial pitch equal to the molecular dimension $L_0$. Thus, the linear density of block A structures (e.g., pillars, spheres, and the like, depending on the choice of polymers) is n times the linear density of the template features imprinted in the resist. In a template having hexagonal close-packed (hcp) arrangement of the imprinted features, the areal density of self-assembled block A structures is $n^2$ times that of the template.

In all embodiments described herein, annealing may be a thermal, chemical (including solvent), irradiative process, or the like.

In the servo zone 120, BCP self-assembly is mainly guided by pre-defined line patterns provided by the template. By controlling a thickness of the BCP spin-coated over the line patterns, the BCP assembles in grooves between the line ridges. By pre-defining a shape and spacing of the lines, self-assembly of BDP may be confined to servo zone formation.

Disclosed herein is a system and processes for incorporating hybrid-guided growth of BCPs in the BPM manufacturing process. Specifically, the processes described herein illustrate how BCPs may be used to form hybrid nano-patterns on a bit pattern media (BPM) substrate. An imprint technique may be used to guide the growth of BCP structures. As a result, embodiments of this disclosure may avoid the pattern defects and chemo-toxicity associated with e-beam lithography techniques. One having ordinary skill in the art will appreciate that different BCPs may be used, such as a cylindrical, lamellar or spherical BCP. In an embodiment, the BCP may have organic components, inorganic components, or a combination of organic and inorganic components. BCP selection may be based upon the size, molecular weight, or other features of the BCP constituent units that are described further below. While specific BCPs are selected for the particular application, the process disclosed herein is a generalized process. Other variations are discussed further below and are illustrated in the figures.

In the following examples, the BCP is comprised of at least two constituent units, structural units or "blocks", herein termed "block A" and "block B", or "A block" and "B block". The following examples describe removal of the A block; however, a person having ordinary skill in the art will appreciate that in an embodiment, the B block may be removed instead of the A block. Use of the singular "block A" or "block B" also includes use of plural "blocks A" and "blocks B." As described above, block A and block B may be organic or inorganic, or block A may be organic, and block B inorganic, or block A may be inorganic and block B organic. In an embodiment, block A or block B comprises an organic polystyrene-block-polymethylmethacrylate (PS-b-PMMA), polystyrene-block-poly2-vinylpyridine, polystyrene-block-poly4-vinylpyridine, polystyrene-block-polyethyleneoxide, polystyrene-block-polyisoprene or polystyrene-block-butadiene. In an embodiment, block A or block B comprises an inorganic polystyrene-block-polydimethylsiloxane (PS-b-PDMS or, more compactly, PS-PDMS) or polystyrene-block-polyferrocenylsilane. A person having ordinary skill in the art will appreciate that the processes described herein may be varied accordingly depending upon the chemical characteristics of the BCP blocks. One will appreciate that selection of the BCP may also depend upon the target pattern to be created using the BCP. For example, the topographical pattern left by the imprinting described below may determine the selection of the BCP, since certain BCP blocks may correlate better with certain topographical pattern features and pattern dimensions. For example, PS-PDMS may be utilized to form spherical BCP structures.

Figure 3A:
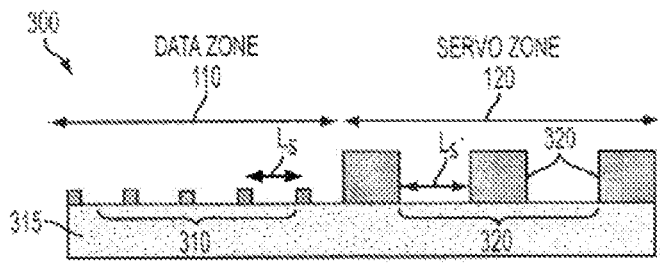
FIGS. 3A-3F illustrates a hybrid pre-pattern structure for self-guided assembly of servo zone and data zone structures, according to an embodiment.
Figure 3B:
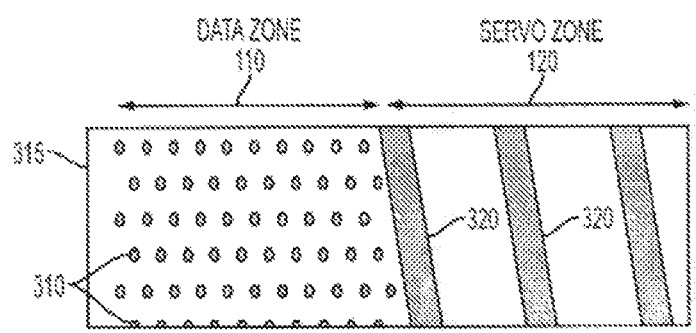

In an aspect of the disclosure, FIGS. 3A-3F illustrates an example of a method 300 for integrated data zone 110 and servo zone 120 template fabrication, using PS-PDMS as a typical spherical BCP. Referring to FIGS. 3A and 3B, in an embodiment of the disclosure, a method 300 of self-assembling density multiplied block copolymers (BCP) structures in the data zone 110 and the servo zone 120 includes coating a substrate 315 with an imprint resist. A low resolution template produces pillars 310 in the data zone 110 of a first height and spacing, and lines 320 of a second height in the servo zone 120. For reasons discussed below, the second height of the lines 320 is greater than the first height of the pillars 310. A composition of the BCP is chosen to have a selected molecular dimension $L_0$, wherein the BCP composition includes a first polymer block (A) and a second polymer block (B). The resist is imprinted with an imprint template having imprinted pillars 310 spaced at a pitch distance $L_s$ based on the selected composition of the BCP and satisfying the equation $L_s = n \times L_0$, where n is an integer density multiplication factor=0, 1, 2, 3, etc. The imprint resist is cured, and additional process steps may be performed to prepare the substrate and imprint resist for coating with the BCP. The BCP is annealed to laterally segregate the BCP into self-assembled structures of the first polymer block A surrounded by the second polymer block B, the structures having a lateral spatial pitch equal to the molecular dimension $L_0$. Thus, the linear density of block A structures (e.g., pillars, spheres, and the like, depending on the choice of polymers) is n times the linear density of the template features imprinted in the resist. In a template having hexagonal close-packed (hcp) arrangement of the imprinted features, the areal density is $n^2$ times that of the template.

In the servo zone 120, BCP self-assembly is mainly guided by pre-defined lines 320 provided by the template. By controlling a thickness of the BCP coated over the lines 320, the BCP is not able to self-segregate during annealing in the space over the lines 320, but only assembles in grooves between the lines 320. By pre-defining a shape and spacing of the lines, self-assembly of BCP will be confined to desired servo zone 120 formation.

FIG. 3A shows a cross-section, and FIG. 3B shows a plan view of an example structure of a hybrid self-assembly guiding pre-pattern: In the data zone 110, pre-register pillars 310 are formed in resist at a pitch distance $L_s$ patterned for BCP guided self-assembly in an hcp array with the molecular dimension $L_0$, determined by the choice of polymers A and B, on a substrate 315. In the servo zone 120, ridge lines 320 are applied to confine BCP self-assembly, where the spacing between the lines 320 are selected based on a similar rule, i.e., $L_s' = n' \times L_0$, where the gap $L_s'$ is the gap space between the lines 320, and is an integer multiple n' of the molecular dimension $L_0$ of the selected BCP.

Figure 3C:
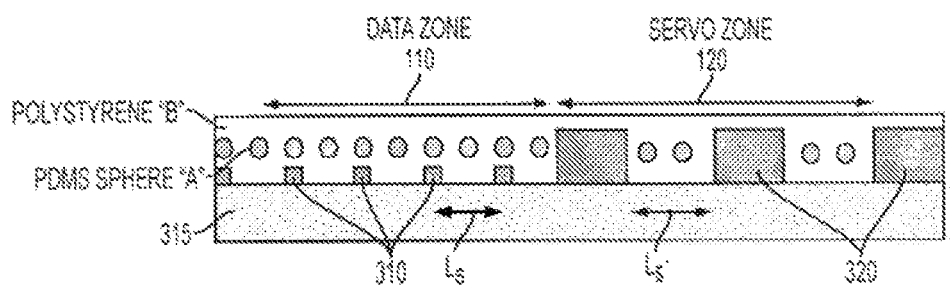

Referring to FIG. 3C, the BCP is annealed to induce lateral segregation of the A and B block polymers. In an aspect of the disclosure, the thickness of the deposited BCP is selected so that in the data zone 110, the pillars 310 anchor the formation of spherical block A polymer dot (e.g., PDMS spheres) surrounded by block B polymer (e.g., polystyrene PS) with long-range ordering determined by the relationship $L_s = n \times L_0$. In the example shown in FIGS. 3A-3C, n=2, but $L_s$ may be chosen for n having another integer value.

In the servo zone 120, the height of the ridge lines 320 and the thickness of the BCP coating over the lines 320 may be chosen to be too thin to permit formation of block A polymer on top of the lines 320. Instead, lateral segregation of A and B polymers may be restricted to the space between the ridge lines 320 according to $L_s'=n'\times L_0$, where n' is an integer density multiplication factor=0, 1, 2, 3, etc. In the example shown, n'=2 and the number of polymer dots is equivalent to n', but the spacing may be larger to accommodate n' rows of block A polymer dots.

Figure 3D:
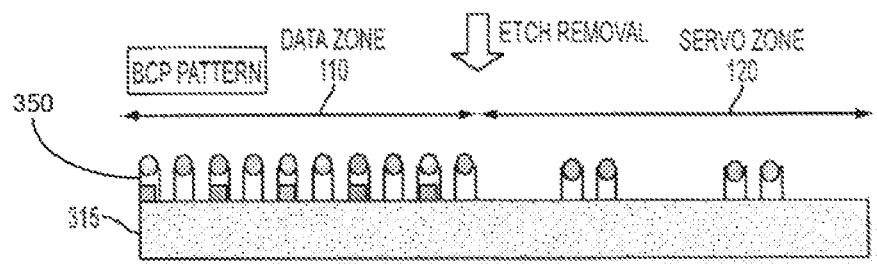

FIG. 3D illustrates the result removal of selective etch removal of the exposed B polymer block and imprint resist after annealing. The selective etch may be an $O_2$ reactive ion etch, for example, which does not substantially remove the A polymer block, which acts as an etch mask. After coating, and annealing, due to the topographical effect, formation of pillars comprising spherical block PDMS atop a columns of PS masked by the PDMS during the etch removal process resulting in long-range ordered pillar features 350 with high placement accuracy may be achieved in the data zone 110. In the servo zone 120, block copolymer on top of the ridge lines 320 may not self-assemble well due to copolymer thinness. Grooves force BCP to align to them and confine BCP into designed servo formation.

Figure 3E:
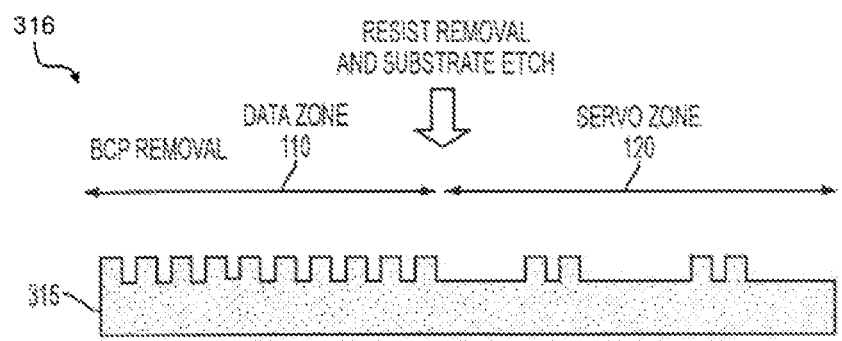

The remaining A polymer (e.g., spherical polymer) and B polymer and resist masked by the A polymer may serve as a mask. Referring to FIG. 3E, in an aspect of the disclosure, substrate 315 may be quartz, or a material suitable for etching in a process that does not also substantially etch the A and B polymers and resist. Thus, the substrate may be etched to produce a template 316 from the substrate, as shown in FIG. 3E, after removal of the A and B polymers and resist.

Figure 3F:
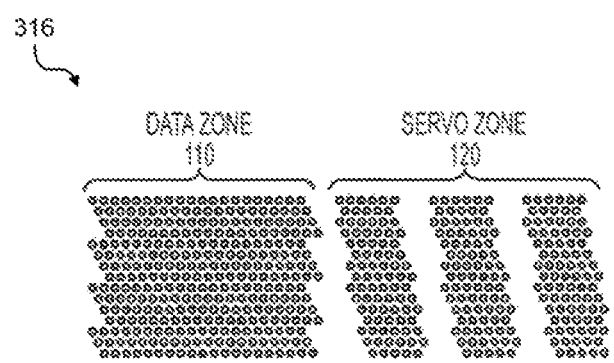

A plan view of the template 316 is shown in FIG. 3F, where the dots represent the pillars remaining after the substrate 315 has been etched and all polymers and resist removed. The resulting template may be used to imprint a resist or other imprintable material a substrate on which, for example, magnetic, magneto-optical, optical, electronic or equivalent high density features may be formed.

Figure 4A:
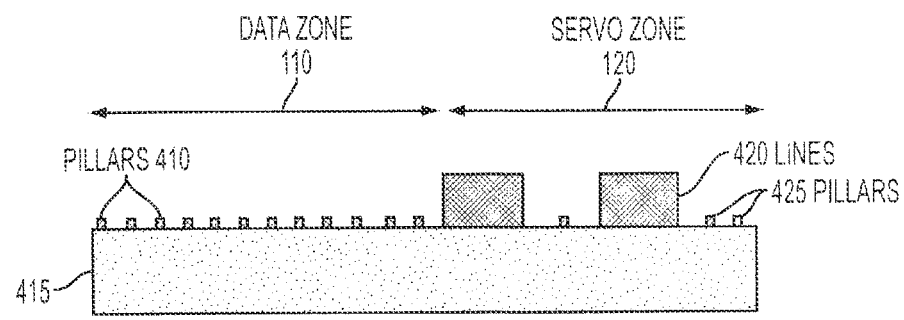
FIGS. 4A-4F illustrate another example for integrated template fabrication using hybrid guiding pre-pattern for BCP self-assembly with cylindrical block copolymer of servo zone and data zone structures, according to an embodiment.

In another aspect of the disclosure, FIGS. 4A-4F illustrates another example for integrated template fabrication using hybrid guiding pre-pattern for BCP self-assembly with cylindrical block copolymer, such as PS-PMMA. FIG. 4A illustrate a side view of a substrate 415 having a resist imprinted with a low density template (not shown). The template may imprint features with different heights, as described below. In a data-zone 110, low-density pre-registered pillar dots 410 of resist of a first height are formed for guided BCP self-assembly. In a servo zone 120, BCP assembly will be confined by a combination of resist lines 420 and low density pre-registration resist pillar dots 425. Ridges will define the shape of servo formation and long range order placement accuracy of BCP self-assembly is enhanced by pre-registered resist dots. Pre-registered pillar dots 410, 425 and lines 420 may be either feature protruded (pillar-type) or feature recessed (hole-type). In the following drawing, pillars are applied to illustrate the example. The height of the pillar dots 410 and 425 are lower than the height of the lines 420 for the same reasons given above with respect to FIGS. 3A-3F. Where the imprinting process does not completely remove resist from the regions surrounding the pillars 410, 425 and lines 420, additional descumming and cleaning steps, such as reactive oxygen ion etching, oxygen plasma ashing, or the like, may be used.

Figure 4B:
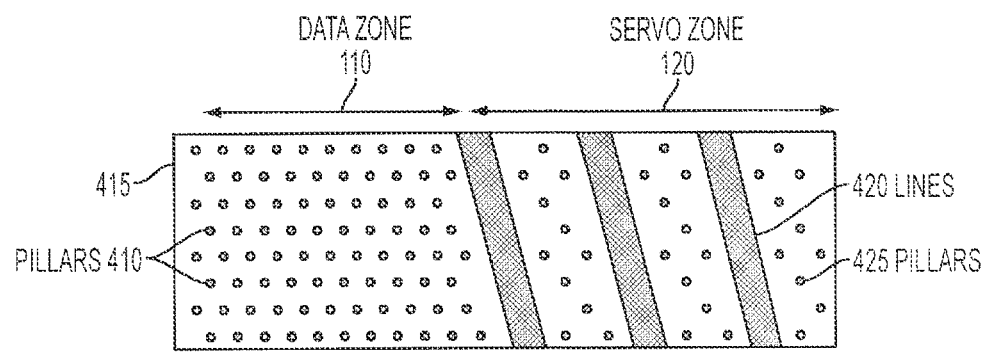
Figure 4C:
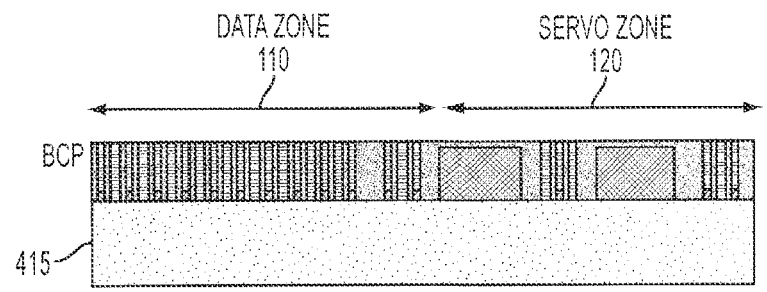

FIG. 4C illustrate block copolymer self-assembly on the hybrid pre-pattern shown in FIGS. 4A and 4B. The resist imprinted substrate 415 is then coated with BCP, such as PS-PMMA. After annealing, the BCP laterally segregates into columns of PMMA polymer (block A) surrounded by PS (polystyrene), where the pillars 410 of resist anchor and enforce the long range order of the density multiplied columns. For the servo zone 120, block copolymer on top of lines 420 may not self-assemble due to a small thickness of BCP above the lines 420 imposed by the greater height of the lines 420. The grooves in the servo zone 120 between the lines 420, however, urge BCP lateral segregation to self-align and assemble to the PMMA block.

Figure 4D:
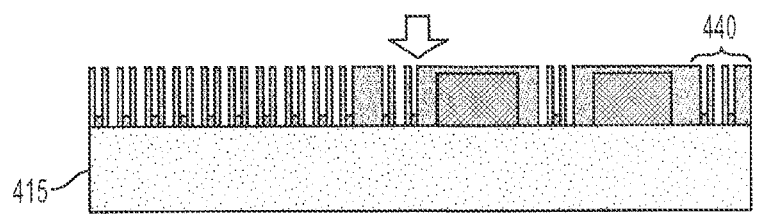
Figure 4E:
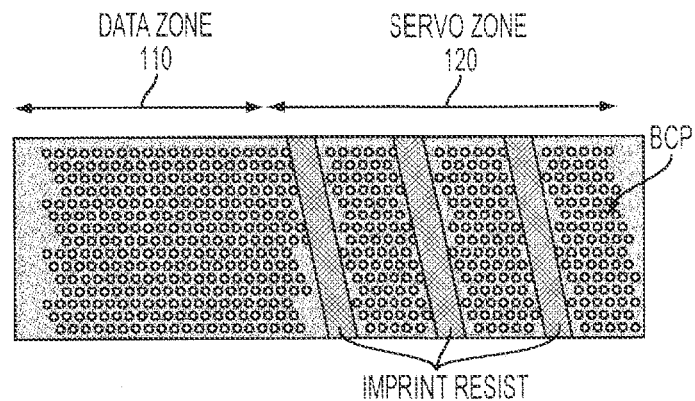

As shown in FIG. 4D, removing the PMMA block (e.g., block A) by an appropriate etching or chemical process leaves high density holes 440 in PS (polystyrene) with long range ordering and high placement accuracy in the data zone 110 and high density holes 440 in PS (polystyrene) with long range ordering and high placement accuracy in the servo zone 120 due to the combination of the gap between lines 420 and pillar dots 425. FIG. 4E is a plan view of the pattern of FIG. 4D.

Figure 4F:
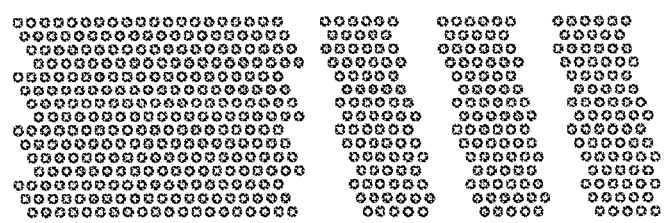

In an aspect of the disclosure, the PS and lines 420 (of resist) coating the substrate 415 may be thinned by an appropriate removal technique (e.g., dry etching) to expose the substrate 415 beneath the holes 440. The entire etched substrate 415, including the remaining resist and PS, may be coated with a masking layer, such as Cr, and the remaining resist and PS removed, leaving Cr dots where PMMA columns previously stood. The substrate 415 may be an etch processible material like quartz, silicon, or the like, which can be etched with the Cr dots serving as a mask. The etching then forms a high density template, as shown in FIG. 4F, of pillars on the substrate including both the data zone 110 and the servo zone 120, which may be used for imprint production of high density BPM.

As previously mentioned, the processes illustrated in FIGS. 3-4 and described herein may form part of a BMP media fabrication process. In an embodiment, this disclosure may be applied to any fabrication process featuring large-area high-density nano-patterning with long-range lateral ordering, such as patterning magnetic film layers in storage media, semiconductor production, and the like. In an embodiment, the processes described herein may be used to fabricate a template for use as a mask, thereby facilitating the deposition of functional materials or other additive processes. In an embodiment, the processes described herein may be used to facilitate the etching of functional materials, to directly or indirectly form a pattern on storage media, or other subtractive processes. Other applications are possible without departing from the scope of this disclosure.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method comprising:
   imprinting features in a resist on a substrate with an imprint mold to form topographic surface patterns in the resist, resulting in imprinted resist, wherein the topographic surface patterns include differing heights;
   depositing a block copolymer ("BCP") material on the imprinted resist, wherein a molecular dimension $L_0$ of the BCP material correlates by an integer multiple to a pitch distance or a gap space of the topographic surface patterns;
   annealing the deposited BCP; and
   removing at least a portion of the annealed BCP to form a template having pillar features.

2. The method of claim 1, further comprising removing the resist from regions surrounding the topographic surface patterns.

3. The method of claim 2, wherein the removing the resist comprises exposing the imprinted resist to oxygen plasma.

4. The method of claim 1, wherein the BCP material is polystyrene-block-polymethylmethacrylate (PS-b-PMMA), polystyrene-block-poly2-vinylpyridine, polystyrene-block-poly4-vinylpyridine, polystyrene-block-polyethyleneoxide, polystyrene-block-polyisoprene, or polystyrene-block-butadiene.

5. The method of claim 1, wherein the BCP material is polystyrene-block-polydimethylsiloxane (PS-b-PDMS), or polystyrene-block-polyferrocenylsilane.

6. The method of claim 1, wherein the removing of at least a portion of the annealed BCP forms pillar features having pitch distance of 5-100 nm.

7. The method of claim 1, further comprising using the template to pattern a second resist.

8. The method of claim 1, further comprising using the template as a mask.

9. The method of claim 1, wherein the topographic surface patterns include pillars in a data zone.

10. The method of claim 1, wherein the topographic surface patterns include lines in a servo zone.

11. The method of claim 1, wherein the topographic surface patterns include pillars of a first height and lines of a second height.

12. The method of claim 11, wherein the second height is greater than the first height.

13. The method of claim 1, further comprising etching the substrate, wherein the pillar features mask the substrate during the etching.

* * * * *